US012406182B2

(12) United States Patent
Chen et al.

(10) Patent No.: US 12,406,182 B2
(45) Date of Patent: Sep. 2, 2025

(54) MACHINE LEARNING METHOD AND MACHINE LEARNING SYSTEM INVOLVING DATA AUGMENTATION

(71) Applicant: HTC Corporation, Taoyuan (TW)

(72) Inventors: Chih-Yang Chen, Taoyuan (TW); Che-Han Chang, Taoyuan (TW); Edward Chang, Taoyuan (TW)

(73) Assignee: HTC Corporation, Taoyuan (TW)

(*) Notice: Subject to any disclaimer, the term of this patent is extended or adjusted under 35 U.S.C. 154(b) by 1074 days.

(21) Appl. No.: 17/338,707

(22) Filed: Jun. 4, 2021

(65) Prior Publication Data

US 2021/0383224 A1    Dec. 9, 2021

Related U.S. Application Data

(60) Provisional application No. 63/034,993, filed on Jun. 5, 2020.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .. G06N 3/08; G06N 3/04; G06N 3/09; G06N 3/0985; G06N 3/045; G06N 5/01;
(Continued)

(56) References Cited

U.S. PATENT DOCUMENTS

| 2019/0066313 A1* | 2/2019 | Kim ................... G06V 10/255 |
| 2019/0251439 A1 | 8/2019 | Zoph et al. |
| 2020/0210773 A1* | 7/2020 | Li ..................... G06F 18/217 |

FOREIGN PATENT DOCUMENTS

| CN | 110110861 A | 8/2019 |
| JP | 2020087103 A | 6/2020 |

(Continued)

OTHER PUBLICATIONS

Wu, Jia, et al. "Hyperparameter optimization for machine learning models based on Bayesian optimization." Journal of Electronic Science and Technology 17.1 (2019): 26-40. (Year: 2019).*

(Continued)

*Primary Examiner* — KC Chen
*Assistant Examiner* — Megan Elizabeth Hwang
(74) *Attorney, Agent, or Firm* — CKC & Partners Co., LLC

(57) ABSTRACT

A machine learning method includes steps of: (a) obtaining initial values of hyperparameters and hypernetwork parameters; (b) generating first classification model parameters according to the hyperparameters and the hypernetwork parameters, and updating the hypernetwork parameters according to a classification result based on the first classification model parameters relative to a training sample; (c) generating second classification model parameters according to the hyperparameters and the updated hypernetwork parameters, and updating the hyperparameters according to another classification result based on the second classification model parameters relative to a verification sample; and (d) repeating the steps (b) and (c) for updating the hypernetwork parameters and the hyperparameters.

16 Claims, 9 Drawing Sheets

(58) Field of Classification Search
CPC ...... G06N 20/00; G06N 5/022; G06F 18/214; G06F 18/241

See application file for complete search history.

(56) References Cited

FOREIGN PATENT DOCUMENTS

| | | | | |
|---|---|---|---|---|
| KR | 102336295 B1 | * | 10/2016 | ............... G06N 3/04 |
| TW | I675335 B | | 10/2019 | |
| WO | 2020070876 A1 | | 4/2020 | |

OTHER PUBLICATIONS

Kim, Juyong, et al. "SplitNet: Learning to semantically split deep networks for parameter reduction and model parallelization." International conference on machine learning. PMLR, 2017. (Year: 2017).*

Ekin D. Cubuk et al., "AutoAugment: Learning Augmentation Strategies from Data", 2019 IEEE/CVF Conference on Computer Vision and Pattern Recognition (CVPR), 2019.

Sungbin Lim et al., "Fast AutoAugment", NIPS'19: Proceedings of the 33rd International Conference on Neural Information Processing Systems (NeurIPS), 2019.

Qizhe Xie et al., "Unsupervised Data Augmentation for Consistency Training", arXiv:1904.12848, 2019.

David Berthelot et al., "MixMatch: A Holistic Approach to Semi-Supervised Learning", 33rd Conference on Neural Information Processing Systems (NeurIPS 2019), 2019.

Ting Chen et al., "A Simple Framework for Contrastive Learning of Visual Representations", Proceedings of the 37th International Conference on Machine Learning, PMLR 119, 2020.

Ilya Kostrikov et al., "Image Augmentation Is All You Need: Regularizing Deep Reinforcement Learning from Pixels", arXiv:2004.13649, 2020.

Sergey Ioffe et al., "Batch Normalization: Accelerating Deep Network Training by Reducing Internal Covariate Shift", ICML'15: Proceedings of the 32nd International Conference on International Conference on Machine Learning, 2015.

Hieu Pham et al., "Efficient Neural Architecture Search via Parameter Sharing", arXiv:1802.03268, 2018.

Andrew Brock et al., "SMASH: One-Shot Model Architecture Search through HyperNetworks", ICLR 2018, 2018.

Gabriel Bender et al., "Understanding and Simplifying One-Shot Architecture Search", Proceedings of the 35th International Conference on Machine Learning (ICML), PMLR 80, 2018.

Alex Krizhevsky et al., "Learning Multiple Layers of Features from Tiny Images", Technical Report, 2009.

Sergey Zagoruyko et al., "Wide Residual Networks", BMVC, 2016.

Yuval Netzer et al., "Reading Digits in Natural Images with Unsupervised Feature Learning", NIPS Workshop on Deep Learning and Unsupervised Feature Learning 2011, 2011.

Jia Deng et al., "ImageNet: A Large-Scale Hierarchical Image Database", 2009 IEEE Conference on Computer Vision and Pattern Recognition, 2009.

Kaiming He et al., "Deep Residual Learning for Image Recognition", 2016 IEEE Conference on Computer Vision and Pattern Recognition (CVPR), 2016.

Connor Shorten et al., "A survey on Image Data Augmentation for Deep Learning", Journal of Big Data, 2019.

Alex Krizhevsky et al., "ImageNet Classification with Deep Convolutional Neural Networks", Advances in Neural Information Processing Systems, 2012.

Terrance Devries et al., "Improved Regularization of Convolutional Neural Networks with Cutout", arXiv:1708.04552, 2017.

Hongyi Zhang et al., "mixup: Beyond Empirical Risk Minimization", ICLR 2018.

Sangdoo Yun et al., "CutMix: Regularization Strategy to Train Strong Classifiers with Localizable Features", 2019 EEE/CVF International Conference on Computer Vision (ICCV), 2019.

Barret Zoph et al., "Neural Architecture Search With Reinforcement Learning", ICLR 2017.

Hanxiao Liu et al., "Darts: Differentiable Architecture Search", ICLR 2019.

Chen Lin et al., "Online Hyper-parameter Learning for Auto-Augmentation Strategy", 2019 IEEE/CVF International Conference on Computer Vision (ICCV), 2019.

Ekin D. Cubuk et al., "RandAugment: Practical automated data augmentation with a reduced search space", arXiv:1909.13719, 2019.

Yonggang Li et al., "DADA: Differentiable Automatic Data Augmentation", arXiv:2003.03780, 2020.

Tong Yu et al., "Hyper-Parameter Optimization: A Review of Algorithms and Applications", arXiv:2003.05689, 2020.

Nitish Srivastava et al., "Dropout: A Simple Way to Prevent Neural Networks from Overfitting", Journal of Machine Learning Research vol. 15, pp. 1929-1958, 2014.

Kinyu Zhang et al., "Adversarial Autoaugment", ICLR 2020, 2020.

Diederik P. Kingma et al., "Adam: a Method for Stochastic Optimization", ICLR 2015, 2015.

Adam Paszke et al., "PyTorch: An Imperative Style, High-Performance Deep Learning Library", 33rd Conference on Neural Information Processing Systems (NeurIPS 2019), 2019.

Xavier Gastaldi et al., "Shake-Shake regularization", ICLR 2017.

Yoshihiro Yamada et al., "Shakedrop Regularization for Deep Residual Learning", IEEE Access, 2019.

Felipe Petroski Such et al., "Generative Teaching Networks: Accelerating Neural Architecture Search by Learning to Generate Synthetic Training Data", arXiv:1912.07768, 2019.

David Ha et al.," HYPERNETWORKS", arXiv:1609.09106 (ICLR 2017), 2016.

European Search Report of the European application No. 21177789.1 issued on Nov. 5, 2021.

Corresponding Taiwan office action issued on Aug. 23, 2022.

Jonathan Lorraine et al., "Stochastic Hyperparameter Optimization through Hypernetworks", arXiv:1802.09419v2, Mar. 8, 2018.

The office action of the corresponding Korean application No. KR10-2021-0072866 issued on Jul. 15, 2024.

Daniel Ho et al., "Population Based Augmentation: Efficient Learning of Augmentation Policy Schedules", Proceedings of the 36th International Conference on Machine Learning (ICML), 2019.

Max Jaderberg et al., "Population Based Training of Neural Networks", arXiv:1711.09846v2, 2017.

Matthew Mackay et al., "Self-Tuning Networks:Bilevel Optimization of Hyperparameters Using Structured Best-Response Functions", ICLR, 2019.

The office action of the corresponding Taiwanese application No. TW110120430 issued on May 11, 2023.

Corresponding Japan office action issued on Jun. 14, 2022.

\* cited by examiner

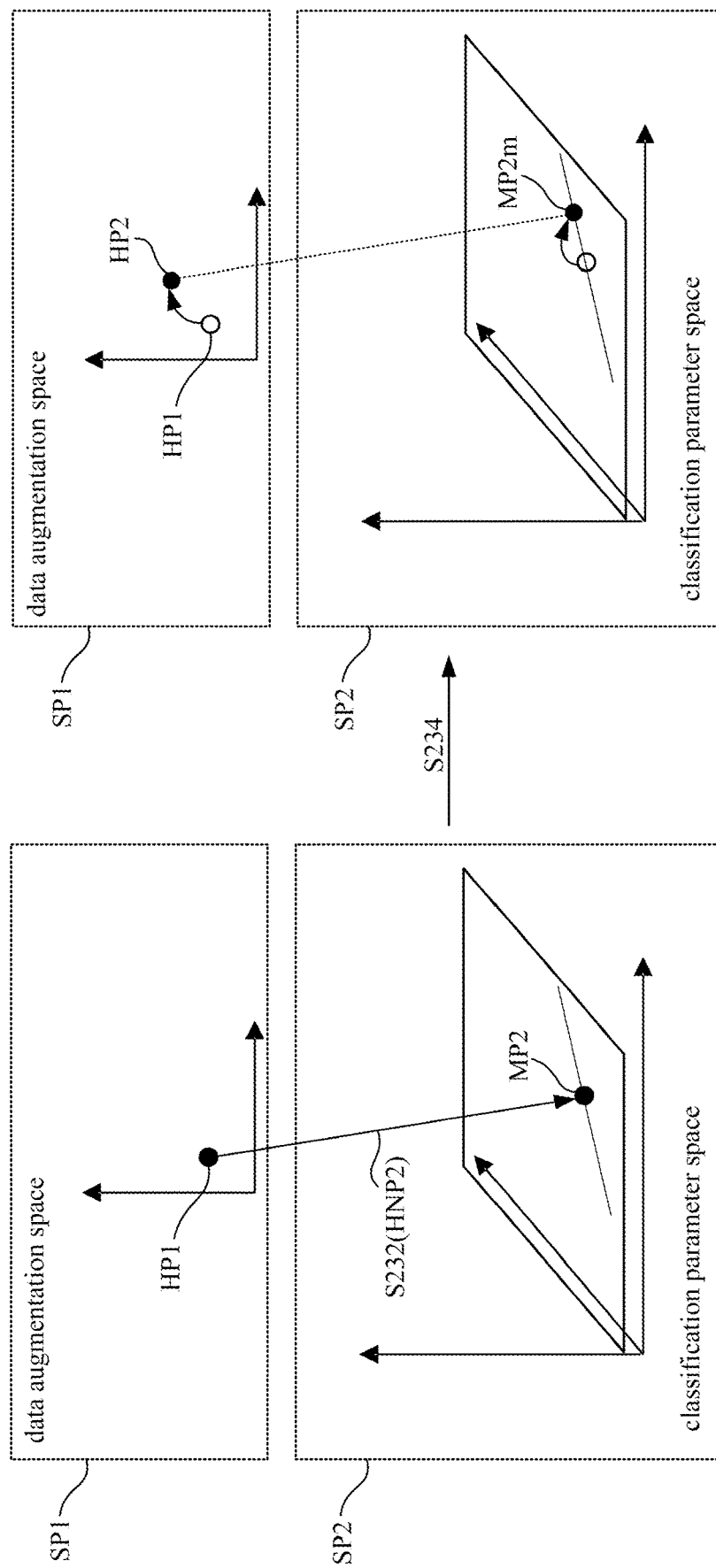

MACHINE LEARNING METHOD AND MACHINE LEARNING SYSTEM INVOLVING DATA AUGMENTATION

RELATED APPLICATIONS

This application claims the priority benefit of U.S. Provisional Application Ser. No. 63/034,993, filed Jun. 5, 2020, which is herein incorporated by reference.

BACKGROUND

Field of Invention

The disclosure relates to a machine learning technology. More particularly, the disclosure relates to a machine learning technology with data augmentation function.

Description of Related Art

Technologies such as machine learning and neural networks are widely used in a technical field of computer vision. One of the important applications of computer vision is to detect or identify objects (such as human faces, vehicle license plates, etc.) contained in pictures or images. The object detection can be realized through feature extraction and feature classification.

In order to correctly detect objects in pictures or images and improve the accuracy of detection, it requires a large amount of training data (such as input images and corresponding classification labels attached to the input images for training), so that the neural network for classification is able to learn a correlation between the input image and the correct classification label from the training data. In practice, it is quite difficult to obtain a sufficient amount of training data to meet the accuracy requirements. Lack of sufficient training data samples becomes a common program among various object detection applications.

SUMMARY

The disclosure provides a machine learning method, which includes following steps: (a) obtaining initial values of a hyperparameter and a hypernetwork parameter; (b) generating a first classification model parameter according to the hyperparameter and the hypernetwork parameter, and updating the hypernetwork parameter according to a classification result based on the first classification model parameter relative to a training sample; (c) generating a second classification model parameter according to the hyperparameter and the updated hypernetwork parameter, and updating the hyperparameter according to another classification result based on the second classification model parameter relative to a verification sample; and (d) repeating the steps (b) and (c) for updating the hypernetwork parameter and the hyperparameter.

The disclosure provides a machine learning system, which includes a memory unit and a processing unit. The memory unit is configured for storing initial values of a hyperparameter and a hypernetwork parameter. The processing unit is coupled with the memory unit. The processing unit is configured to run a hypernetwork and a classification model. The processing unit is configured to execute operations of: (a) generating a first classification model parameter by the hypernetwork according to the hyperparameter and the hypernetwork parameter, generating a classification result by the classification model based on the first classification model parameter relative to a training sample, and updating the hypernetwork parameter according to the classification result; (b) generating a second classification model parameter by the hypernetwork according to the hyperparameter and the updated hypernetwork parameter, generating another classification result by the classification model based on the second classification model parameter relative to a verification sample, and updating the hyperparameter according to the another classification result; and (c) repeating the operations (a) and (b) for updating the hypernetwork parameter and the hyperparameter.

The disclosure provides a non-transitory computer-readable storage medium, which stores at least one instruction program executed by a processor to perform a machine learning method. The machine learning method includes steps of: (a) obtaining initial values of a hyperparameter and a hypernetwork parameter; (b) generating a first classification model parameter according to the hyperparameter and the hypernetwork parameter, and updating the hypernetwork parameter according to a classification result based on the first classification model parameter relative to a training sample; (c) generating a second classification model parameter according to the hyperparameter and the updated hypernetwork parameter, and updating the hyperparameter according to another classification result based on the second classification model parameter relative to a verification sample; and (d) repeating the steps (b) and (c) for updating the hypernetwork parameter and the hyperparameter.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 9A is a schematic diagram illustrating a conversion from the hyperparameter into the second classification model parameter in some embodiments of the disclosure.

FIG. 9B is a schematic diagram illustrating the updating of the hyperparameter according to the second loss in some embodiments of the disclosure.

DETAILED DESCRIPTION

Figure 1:
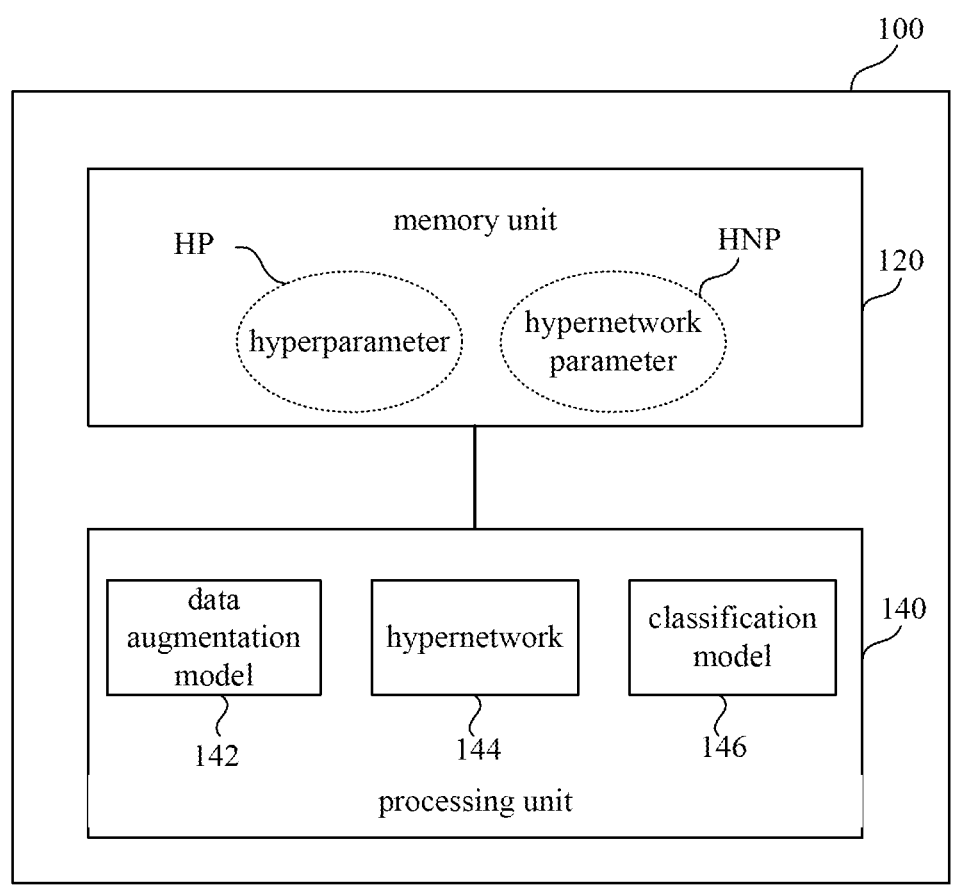
FIG. 1 is a schematic diagram illustrating a machine learning system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a machine learning system 100 according to an embodiment of the disclosure. The machine learning system 100 includes a memory unit 120 and a processing unit 140. The processing unit 140 is coupled with the memory unit 120.

In some embodiments, the machine learning system 100 can be established by a computer, a server or a processing center. In some embodiments, the processing unit 140 can be realized by a processor, a central processing unit or a computing unit. In some embodiments, the memory unit 120 can be realized by a memory, a flash memory, a read-only memory (ROM), a hard disk or any equivalent storage component.

In some embodiments, the machine learning system 100 is not limited to include the memory unit 120 and the processing unit 140. The machine learning system 100 may further include other components required to operating the machine learning system 100 in various applications. For example, the machine learning system 100 may further include an output interface (e.g., a display panel for displaying information), an input interface (e.g., a touch panel, a keyboard, a microphone, a scanner or a flash memory reader) and a communication circuit (e.g., a WiFi communication module, a Bluetooth communication module, a wireless telecommunication module, etc.).

As shown in FIG. 1, initial values of at least two parameters, which include a hyperparameter HP and a hypernetwork parameter HNP, are stored in the memory unit 120. In an embodiment, the machine learning system 100 decides how to perform data augmentation and label classification based on these two parameters (i.e., the hyperparameter HP and the hypernetwork parameter HNP), and further details will be discussed in following paragraphs. Data augmentation is a technology to increase the amount of training data. While training a machine learning model (or a machine learning model), it usually requires a lot of training data. By applying data augmentation to original training data, the original training data can be expanded to a larger amount of augmented training data, so as to avoid an over-fitting issue while training the deep learning model (or the machine learning model).

As shown in FIG. 1, the processing unit 140 is coupled with the memory unit 120. The processing unit 140 is configured to run a data augmentation model 142, a hypernetwork 144 and a classification model 146 based on corresponding software/firmware instruction programs.

In some embodiments, the data augmentation model 142 is configured to perform data augmentation on an inputted training sample to generate multiple augmented training samples. For example, when the inputted training sample includes one original image (e.g., a photo with a car running on a roadway in a daytime) and a training label corresponding to the original image (e.g., car, road or traffic light). The data augmentation model 142 is configured to perform a combination of one or more processes among horizontally flip, vertically flip, rotate, vertically shift, horizontally shift, zoom-in, zoom-out and brightness adjustment on the original image.

In some embodiments, the data augmentation model 142 processes the original image with different settings (e.g., applying different rotation angles or different zoom-in/zoom-out ratios) based on values of the hyperparameter HP to generate multiple data augmentation images of the multiple augmented training samples. Even though these data augmentation images are generated according to the original image, the pixel values in the data augmentation images are changed because of image processing. To the classification model 146, these data augmentation images are equivalent to different training samples, so as to extend the amount of the training samples and solve the insufficiency of the training samples.

In some embodiments, the classification model 146 can classify the input data (such as the aforementioned data augmentation images), for example, detecting that the input image contains vehicles, faces, license plates, text, totems, or other image-feature objects. The classification model 146 is configured to generate a corresponding label according to a classification result. It should be noted that the classification model 146 will refer to a classification model parameter while performing classification operations.

In some embodiments, the hypernetwork 144 is configured to convert the hyperparameter HP into the classification model parameter used by the classification model 146. The hypernetwork 144 determines how to convert the hyperparameter HP into the classification model parameters according to the hypernetwork parameter HNP.

In other words, the hyperparameter HP in some embodiments determines how the data augmentation model 142 performs data augmentation, and also the hyperparameter HP is transformed by the hypernetwork 144 (into the classification model parameter) to determine how the classification model 146 performs classification operations.

Figure 2:
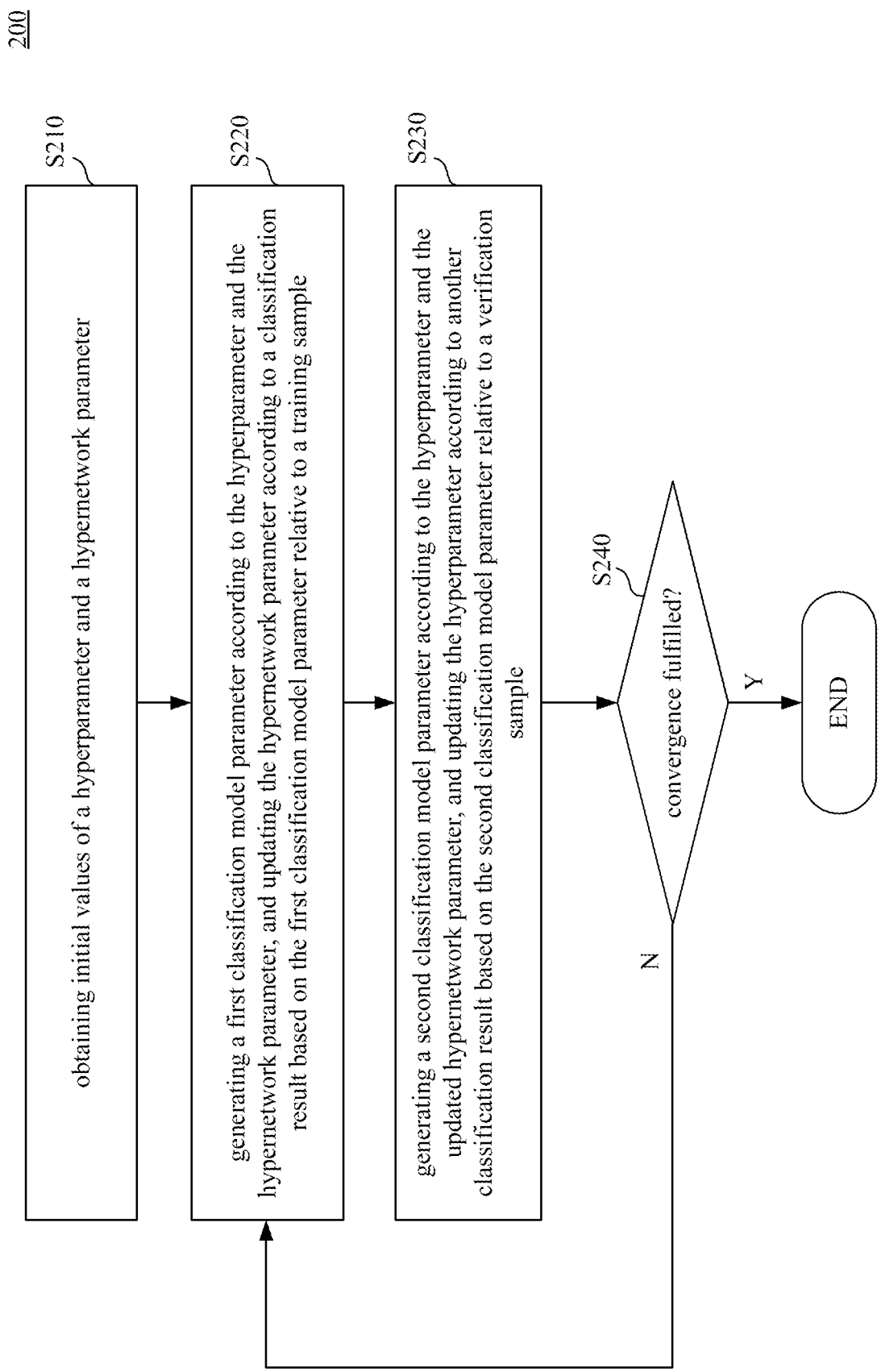
FIG. 2 is a schematic diagram illustrating a machine learning method according to an embodiment of the disclosure.

Reference is further made to FIG. 2, which is a schematic diagram illustrating a machine learning method 200 according to an embodiment of the disclosure. The machine learning system 100 shown in FIG. 1 can be utilized to perform the machine learning method 200 shown in FIG. 2.

As shown in FIG. 2, firstly in step S210, the initial values of the hyperparameter HP and the hypernetwork parameter HNP are obtained. In some embodiments, the initial values of the hyperparameter HP and the hypernetwork parameter HNP can be obtained according to average values from historical training practices, manual-setting default values, or random values.

In step S220, the first classification model parameter is generated according to the hyperparameter and the hypernetwork parameter, and the hypernetwork parameters are updated based on a classification result about a training sample based on the first classification model parameter. In an embodiment, the hypernetwork 144 (based on the hypernetwork parameter HNP) converts the hyperparameter HP into the first classification model parameter, and the hypernetwork parameter HNP is updated according to the classification result relative to the training sample based on the first classification model parameter. Further details about step S220 will be further described in following paragraphs with some examples.

In step S230, the second classification model parameters are generated according to the hyperparameter and the updated hypernetwork parameter, and the hyperparameters are updated according to another classification result about a verification sample based on the second classification model parameter. In an embodiment, the hypernetwork 144 (based on the updated hypernetwork parameter HNP) converts the hyperparameter HP into the second classification model parameter, and the hyperparameter HP is updated according to the another classification result about the verification sample based on the second classification model parameter. Further details about step S230 will be further described in following paragraphs with some examples.

In other words, in step S220, the hypernetwork parameter HNP is updated first. Then, in step S230, the hyperparameter HP is updated based on the new hypernetwork parameter HNP.

In step S240, it is to determine whether a convergence condition is fulfilled. If the convergence condition has not been fulfilled, it returns to step S220 again, and continues to repeat steps S220 and S230 for updating the hypernetwork parameter HNP and the hyperparameter HP. In some embodiments, before the convergence condition is fulfilled, steps S220 and S230 are performed repeatedly for gradually updating the hypernetwork parameter HNP and the hyperparameter HP in an iterative manner.

If the convergence condition has been fulfilled (for example, an accuracy of the classification result given by the classification model 146 exceeds a threshold, a number of training rounds reaches a predetermined number of rounds, am amount of training samples reaches a predetermined amount of samples, or a time length of training duration reaches the predetermined time length, etc.), it means that the machine learning system 100 has completed the training, and the classification model 146 after training can be used to execute subsequent applications. For example, the classification model 146 after the training can be used for object recognition, face recognition, audio recognition, or motion detection within input pictures, images or streaming data.

Figure 3:
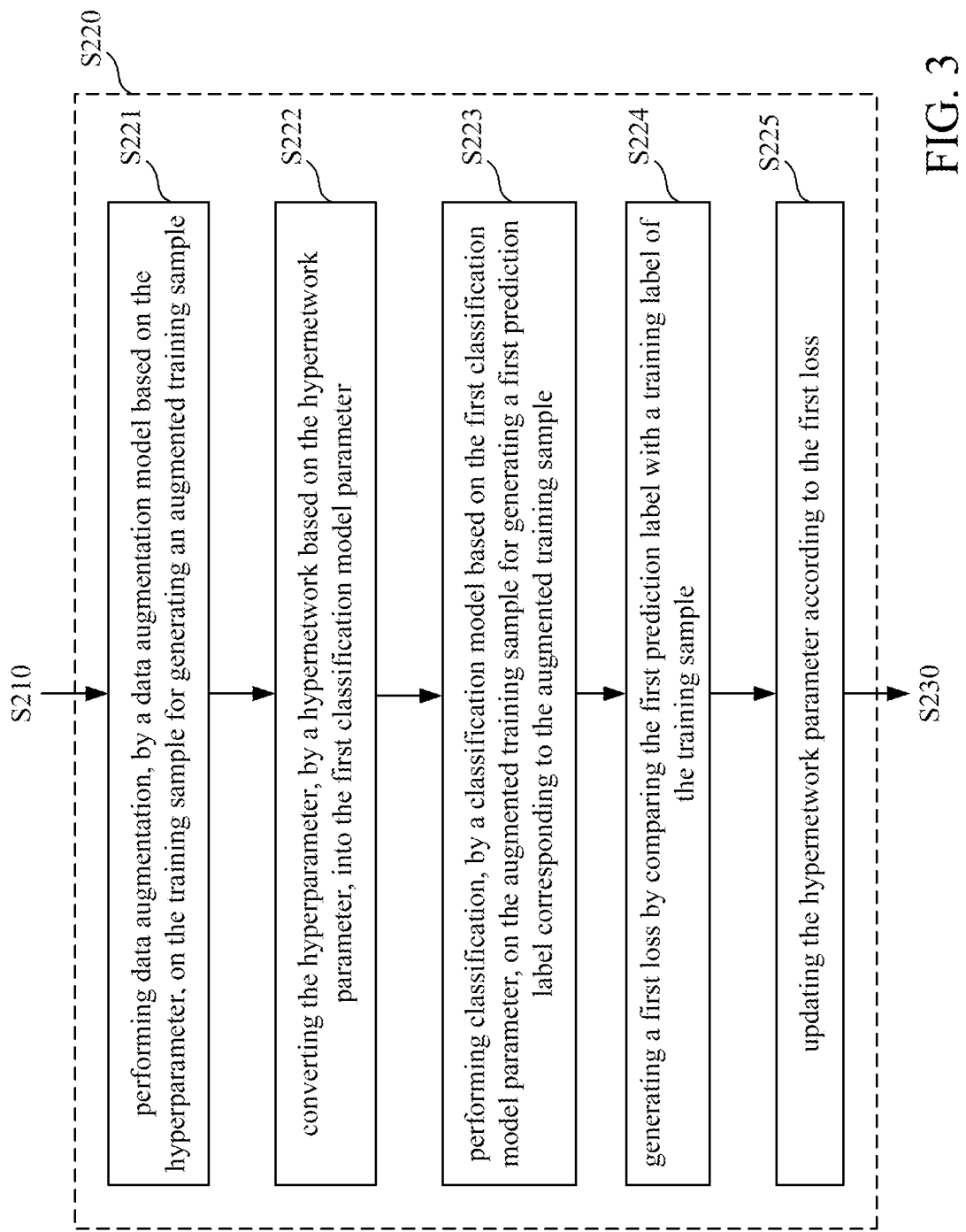
FIG. 3 is a flowchart illustrating further steps within one step shown in FIG. 2 in some embodiments.
Figure 4:
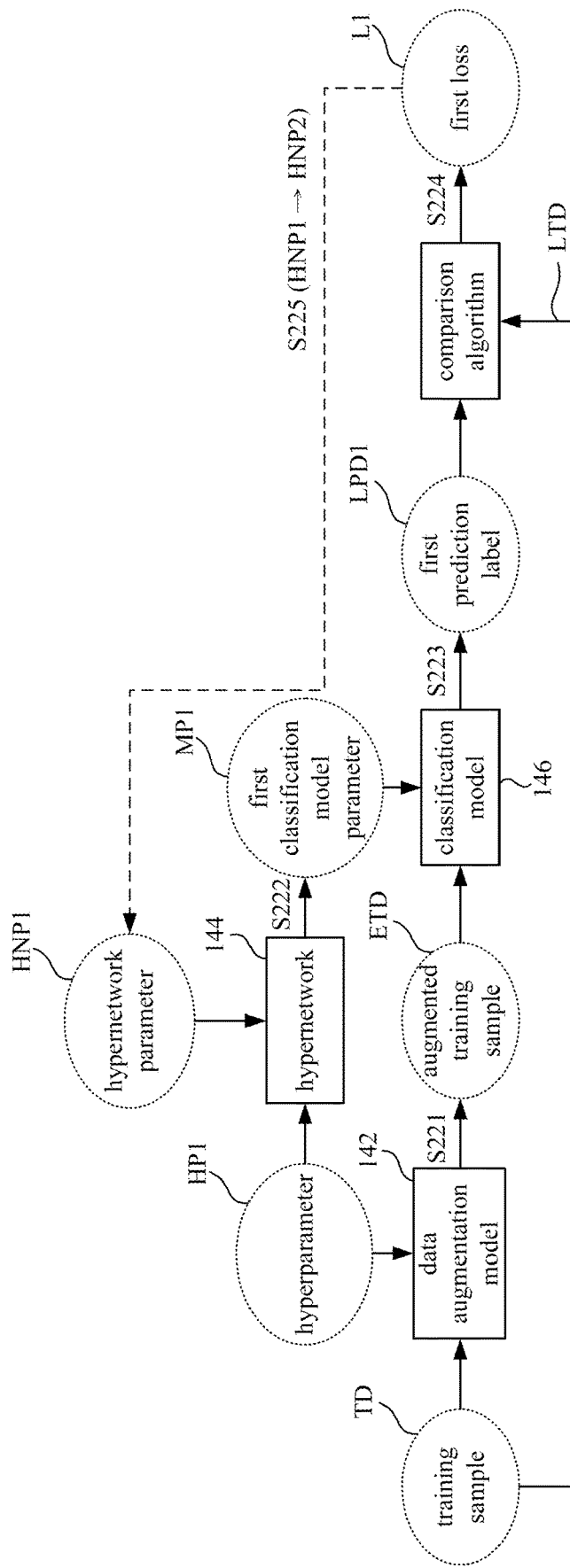
FIG. 4 is a schematic diagram illustrating steps performed by components of the processing unit in some embodiments.

Reference is further made to FIG. 3 and FIG. 4. FIG. 3 is a flowchart illustrating further steps S221 to S225 within step S220 in some embodiments. FIG. 4 is a schematic diagram illustrating steps S221 to S225 performed by components of the processing unit 140 in some embodiments.

As shown in FIG. 4, it is assumed that in an initial state, the initial value of the hyperparameter is the hyperparameter HP1, and the initial value of the hypernetwork parameter is the hypernetwork parameter HNP1.

As shown in FIG. 3 and FIG. 4, in step S221, the data augmentation model 142 performs data augmentation on the training sample TD based on the hyperparameter HP1 to generate an augmented training sample ETD. In step S222, the hypernetwork 144 converts the hyperparameter HP1 into the first classification model parameter MP1 based on the hypernetwork parameter HNP1.

Figures 5A, 5B:
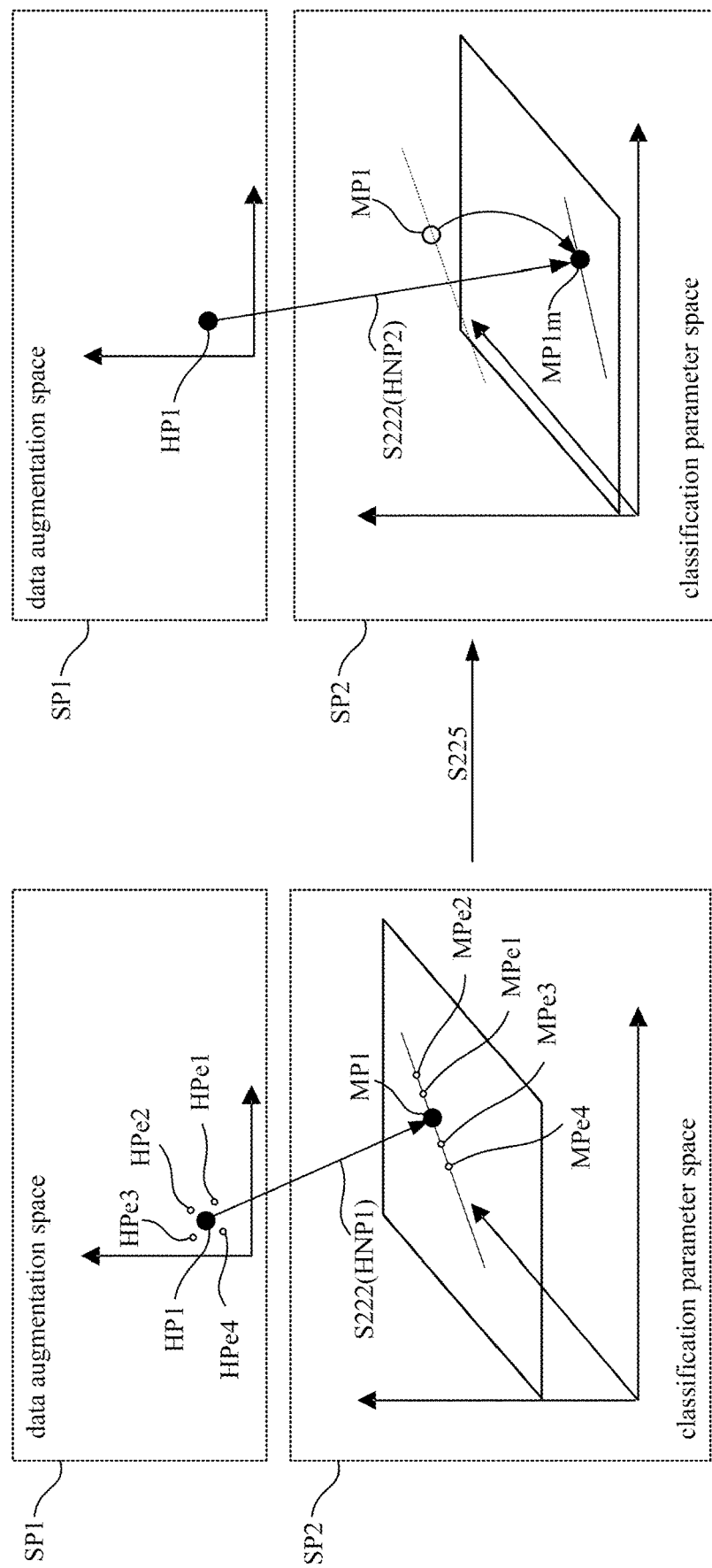
FIG. 5A is a schematic diagram illustrating a conversion from a hyperparameter into the first classification model parameter by the hypernetwork based on the hypernetwork parameter according to some embodiments of the disclosure.
FIG. 5B is a schematic diagram illustrating the hypernetwork parameter updated according to the first loss according to some embodiments of the disclosure.

Reference is further made to FIG. 5A, which is a schematic diagram illustrating a conversion from the hyperparameter HP1 into the first classification model parameter MP1 by the hypernetwork 144 based on the hypernetwork parameter HNP1 in step S222 according to some embodiments of the disclosure. As shown in FIG. 5A, step S222 is executed to map a data point (ie, hyperparameter HP1) in data augmentation space SP1 to a data point (ie, the first classification model parameter MP1) in classification parameter space SP2.

In FIG. 5A, the data augmentation space SP1, for demonstration, is a plane coordinate system with two axes. For example, one axis can represent a rotation angle during data augmentation, and the other axis can represent a ratio of size scaling during data augmentation. In this case, the data points located at different positions of the data augmentation space SP1 correspond to different settings of data augmentation. The classification parameter space SP2, for demonstration, is a three-dimensional coordinate system with three axes, and the three axes can respectively represent three weight values of convolutional layers (in the classification model). In step S222, the hypernetwork parameter HNP1 is used to determine how the hypernetwork 144 maps the hyperparameter HP1 within the data augmentation space SP1 onto the first classification model parameter MP1 within the classification parameter space SP2. If the hypernetwork parameter HNP1 changes, the hypernetwork 144 will map the hyperparameter HP1 onto another position within the classification parameter space SP2.

It is added that, for brevity of description, the data augmentation space SP1 and the classification parameter space SP2 in FIG. 5A are illustrated with two axes and three axes respectively for demonstration. The disclosure is not limited thereto. In practical applications, the data augmentation space SP1 and the classification parameter space SP2 may have different dimension configurations. In some embodiments, the classification parameter space SP2 is a high-dimensional space with more axes.

As shown in FIG. 3 and FIG. 4, in step S223, the classification model 146 classifies the augmented training sample ETD based on the first classification model parameter MP1 to generate a first predicted label LPD1 corresponding to the augmented training sample ETD.

In step S224, the processing unit 140 executes a comparison algorithm for comparing the first prediction label LPD1 with a training label LTD of the training sample TD to generate a first loss L1. In some embodiments, the processing unit 140 performs a cross-entropy calculation on the first predicted label LPD1 and the training label LTD to obtain the first loss L1.

A value of the first loss L1 represents whether the classification result performed by the classification model 146 is accurate. If the first prediction label LPD1 generated by the classification model 146 is the same (or similar) to the training label LTD of the training sample TD, the value of the first loss of L1 will be small, and it means that the first classification model parameter MP1 currently adopted by the classification model 146 is more accurate. If the first prediction label LPD1 generated by the classification model 146 is different from the training label LTD of the training sample TD, the value of the first loss L1 will be larger, and it means that the first classification model parameter MP1 currently adopted by the classification model 146 is relatively inaccurate.

In step S225, the hypernetwork parameter HNP2 is updated according to the first loss L1. Reference is further made to FIG. 5B, which is a schematic diagram illustrating the hypernetwork parameter HNP2 updated according to the first loss L1 in step S225 according to some embodiments of the disclosure. As shown in FIG. 5B, after obtaining the first loss L1 corresponding to the first classification model parameter MP1 currently adopted by the classification model 146, the first loss L1 is backward propagated to the classification model 146, so as to obtain an improved classification model parameter MP1*m* which can reduce (or minimize) the first loss L1. Then, the improved classification model parameter MP1*m* is backward propagated to the hypernetwork 144, and an updated hypernetwork parameter HNP2 is obtained according to the backpropagation based on the improved classification model parameter MP1*m*. In some embodiments, stochastic gradient descent (SGD) algorithm can be used to find the improved classification model parameter MP1*m* to reduce (or minimize) the first loss L1.

As shown in FIG. 4 and FIG. 5B, under the condition that the hyperparameter HP1 remains the same, the hypernetwork 144 (based on the updated hypernetwork parameter HNP2) will map the hyperparameter HP1 onto the improved classification model parameter MP1$m$.

In some embodiments, as shown in FIG. 5A, a plurality of exploration values are introduced in step S222, and these exploration values are used to form a plurality of exploration hyperparameters around the hyperparameter HP1, and each of the exploration values include slight difference in an axis (for example, the rotation angle increases/decreases by 0.5 degrees, the shifting distance increases/decreases by 1%, etc.). As shown in FIG. 5A, there are four exploration hyperparameters HPe1~HPe4 located around the hyperparameter HP1. In addition to mapping the hyperparameter HP1 onto the first classification model parameter MP1 in the classification parameter space SP2, the hypernetwork 144 (based on the hypernetwork parameter HNP1) will map the exploration hyperparameters HPe1~HPe4 formed by these exploration values onto four exploration classification model parameters MPe1~MPe4 in the classification parameter space SP2. In FIG. 5A, the exploration classification model parameters MPe1~MPe4 are also adjacent to the original first classification model parameter MP1. In some embodiments, the first classification model parameter MP1 can also be regarded as one of the exploration classification model parameters.

In other words, when four exploration hyperparameters are added, the four exploration hyperparameters HPe1~HPe4 will be mapped to the other four exploration classification model parameters MPe1~MPe4. The amount of aforementioned exploration hyperparameters (i.e., four exploration hyperparameters) is given for demonstration, and the amount of exploration hyperparameters is not limited to four in practical applications.

In some embodiments, four exploration classification models will be generated according to the four exploration classification model parameters MPe1~MPe4, and the four exploration classification models will classify the training sample TD respectively and produce four outcomes of the first prediction labels LPD1. In step S224, the four outcomes of the first prediction labels LPD1 are compared with the training label LTD respectively, and correspondingly it will obtain four outcomes of the first losses L1 corresponding to the four exploration classification models respectively. In some embodiments, the four outcomes of the first prediction labels LPD1 and the training label LTD are compared by cross-entropy calculation respectively for obtaining the first losses L1.

In this embodiment, in step S225, the four exploration classification models and the four outcomes of the first losses L1 can be all taken in consideration while updating the hypernetwork parameter HNP1 into the hypernetwork parameter HNP2.

Figure 6:
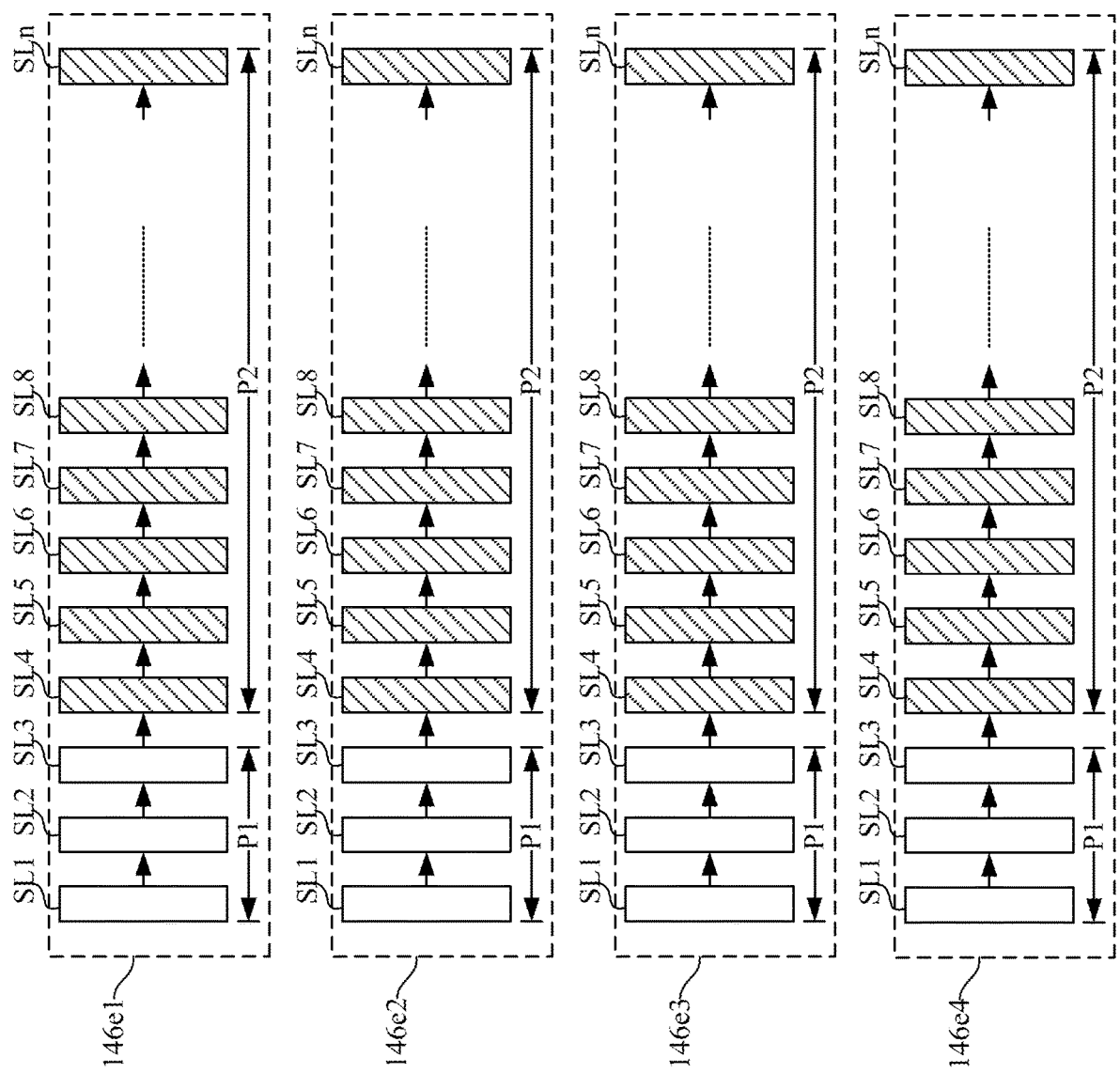
FIG. 6 is a schematic diagram illustrating an internal structure of the four exploration classification models formed from the classification model based on four exploration classification model parameters according to some embodiments of the disclosure.

Reference is further made to FIG. 6, which is a schematic diagram illustrating an internal structure of the four exploration classification models 146$e$1~146$e$4 formed from the classification model 146 based on four exploration classification model parameters MPe1~MPe4 according to some embodiments of the disclosure. As shown in FIG. 6, each of the exploration classification models 146$e$1~146$e$4 includes n neural network structure layers SL1, SL2, SL3, SL4, SL5 . . . SL$n$. In some embodiments, each of the neural network structure layers SL1, SL2, SL3, SL4, SL5 . . . SL$n$ can be a convolution layer, a pooling layer, a linear rectification layer, a fully connected layer or other type of neural network structure layer.

In some embodiments, n is a positive integer. In general, the total number of layers in the classification model can be determined according to application requirements (e.g., classification accuracy requirement, complexity of classification target, and diversity of input images). In some cases, a common range of n can be ranged between 16 and 128, and the disclosure is not limited to a specific number of layers.

For example, the neural network structure layers SL1 and SL2 can be convolutional layers; the neural network structure layer SL3 can be a pooling layer; the neural network structure layers SL4 and SL5 can be convolutional layers; the neural network structure layer SL6 can be a pooling layer, the neural network structure layer SL7 can be a convolutional layer; the neural network structure layer SL8 can be a linear rectification layer; and the neural network structure layer SL$n$ can be a fully connected layer, and the disclosure is not limited thereto.

As shown in FIG. 6, the neural network structure layers SL1~SL$n$ are divided into a first structure layer portion P1 and a second structure layer portion P2 after the first structure layer portion P1. In the embodiment shown in FIG. 6, the first structure layer portion P1 includes the neural network structure layers SL1~SL3, and the second structure layer portion P2 includes the neural network structure layers SL4~SL$n$.

Each one of the exploration classification model parameters MPe1~MPe4 for forming the exploration classification models 146$e$1~146$e$4 includes a first weight parameter content (configured to determine the operation of the first structural layer portion P1) and a second weight parameter content (configured to determine the operation of the second structure layer portion P2). In some embodiments, the second structure layer portions P2 (ie, the neural network structure layers SL4~SL$n$) of the four exploration classification models 146$e$1~146$e$4 share the same second weight parameter content, and the neural network structure layers SL4~SL$n$ among the four exploration classification models 146$e$1~146$e$4 are operating with the same logic.

In other words, the neural network structure layer SL4 of the exploration classification model 146$e$1 and the neural network structure layer SL4 of the exploration classification model 146$e$2 use the same weight parameters and are operating with the same logic. Similarly, the neural network structure layer SL5 of the exploration classification model 146$e$1 and the neural network structure layer SL5 of the exploration classification model 146$e$2 use the same weight parameters and are operating with the same logic, and so on.

On the other hand, each one of the first structure layer portions P1 (i.e., the neural network structure layers SL1~SL3) of the four exploration classification models 146$e$1~146$e$4 has the first weight parameter content independent from others. The logic of the neural network structure layer SL1~SL3 in one exploration classification model is different from the logic of the neural network structure layer SL1~SL3 in another exploration classification model.

The distribution of the first structure layer portion P1 and the second structure layer portion P2 shown in FIG. 6 is for demonstration, and the disclosure document is not limited thereto.

In an embodiment, the first structure layer portion P1 in each of the exploration classification models 146$e$1~146$e$4 at least includes a first convolutional layer. For example, the first structure layer part P1 includes the neural network structure layer SL1 (i.e., the first convolutional layer), the first convolutional layers of the exploration classification models 146$e$1~146$e$4 have different weight parameters from each other. In this embodiment, the rest of the neural network structure layers SL2~SLn all belong to the second structure layer portion P2 (not shown in the figure), and the second structure layer part P2 includes a second convolutional layer and a fully connected layer. The second convolutional layer and the fully connected layer of the exploration classification models 146e1~146e4 have the same weight parameters across the classification models 146e1~146e4. In this embodiment, since most of the neural network structure layers SL2~SLn share the same weight parameters, only fewer neural network structure layer (e.g., the neural network structure layer SL1) uses independent weight parameters, the neural network structure is relatively simple while training, able to achieve a faster training speed, requires less computing resources, and also able to maintain accuracy according to experiment outcomes.

Figure 7:
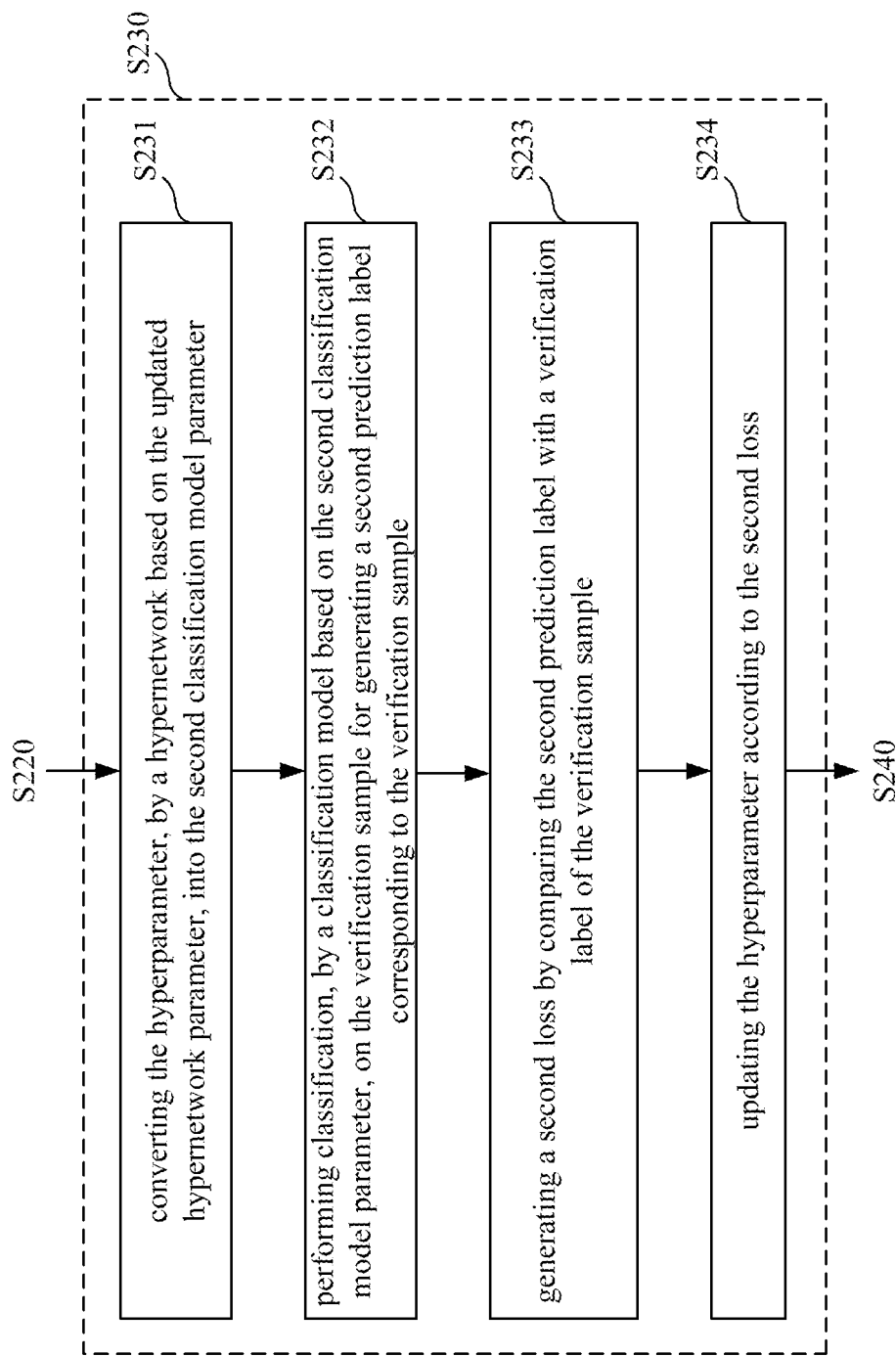
FIG. 7 is a flowchart illustrating detailed steps within one step shown in FIG. 2 in some embodiments.
Figure 8:
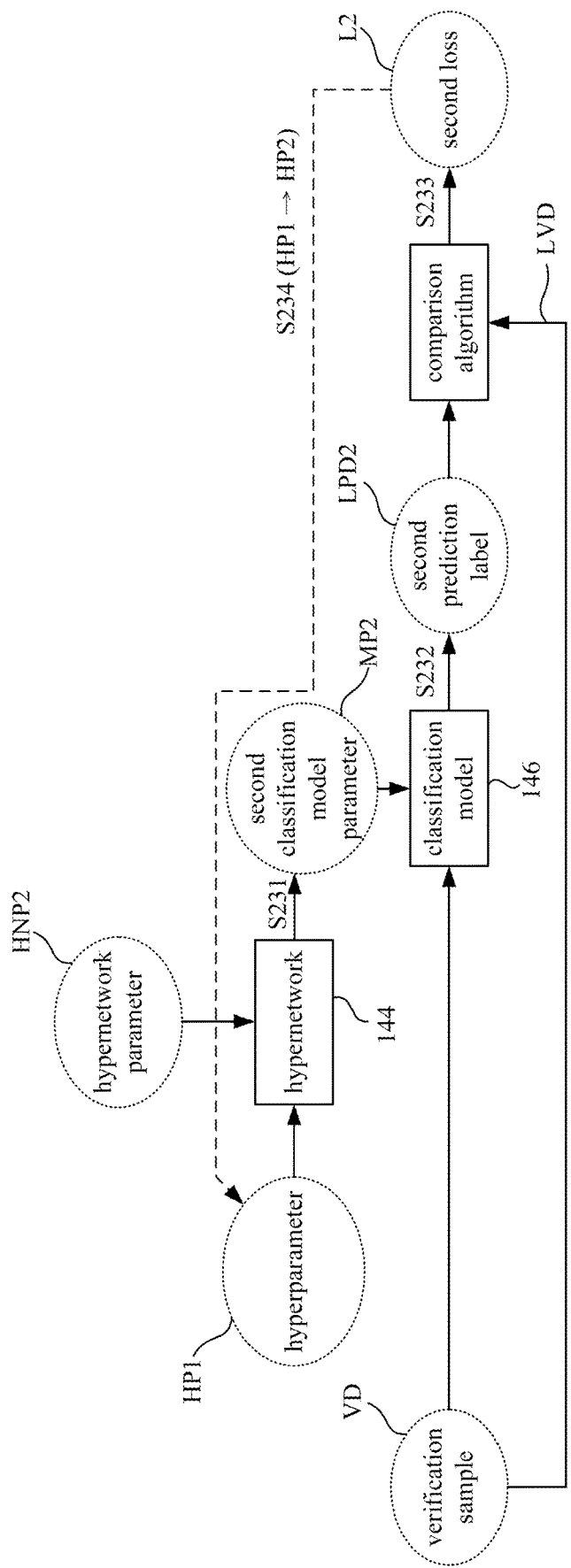
FIG. 8 is a schematic diagram illustrating steps performed by components of the processing unit in some embodiments.

Reference is further made to FIG. 7 and FIG. 8. FIG. 7 is a flowchart illustrating detailed steps S231 to S234 within step S230 in some embodiments. FIG. 8 is a schematic diagram illustrating steps S231 to S234 performed by components of the processing unit 140 in some embodiments.

After step S220 shown in FIG. 3 and FIG. 4, when the method enters step S230, as shown in FIG. 8, the current value of the hyperparameter is still the hyperparameter HP1, and the current value of the hypernetwork parameter has been updated to the hypernetwork parameter HNP2.

As shown in FIG. 7 and FIG. 8, in step S231, the hypernetwork 144 (based on the updated hypernetwork parameter HNP2) converts the hyperparameter HP1 into the second classification model parameter MP2. The classification model parameter MP2 is equal to the improved classification model parameter MP1m obtained in the aforesaid embodiments in FIG. 5B through back-propagation. Reference is further made to FIG. 9A, which is a schematic diagram illustrating a conversion from the hyperparameter HP1 into the second classification model parameter MP2 in step S231 in some embodiments of the disclosure. As shown in FIG. 9A, step S231 is configured to map a data point (i.e., the hyperparameter HP1) in the data augmentation space SP1 onto a data point (i.e., the second classification model parameter MP2) in the classification parameter space SP2.

In step S231, the hypernetwork parameter HNP2 is used to determine how the hypernetwork 144 maps the hyperparameter HP1 in the data augmentation space SP1 onto the second classification model parameter MP2 in the classification parameter space SP2.

Comparing FIG. 9A with FIG. 5A, since the hypernetwork parameter HNP2 is already different from the hypernetwork parameter HNP1 in the previous embodiment (as shown in FIG. 5A), the same hyperparameter HP1 will be mapped by the hypernetwork 144 onto a new position (i.e., the second classification model parameter MP2) in the classification parameter space SP2.

As shown in FIG. 7 and FIG. 8, in step S232, the classification model 146 classifies a verification sample VD based on the second classification model parameter MP2 to generate a second prediction label LPD2 corresponding to the verification sample VD.

In step S233, the processing unit 140 executes a comparison algorithm to compare the second predicted label LPD2 with the verification label LVD of the verification sample VD for generating a second loss L2. In some embodiments, the processing unit 140 performs cross-entropy calculation between the second predicted label LPD2 and the verification label LVD to obtain the second loss L2.

A value of the second loss L2 represents whether the classification result performed by the classification model 146 is accurate. If the second prediction label LPD2 generated by the classification model 146 is the same (or similar) to the verification label LVD of the verification sample VD, the value of the second loss will be small, and it means that the second classification model parameter MP2 adopted by the current classification model 146 is more accurate. If the second prediction label LPD2 generated by the classification model 146 is different from the verification label LVD of the verification sample VD, the value of the second loss L2 will be larger, and it means that the second classification model parameter MP2 adopted by the current classification model 146 is relatively inaccurate.

In step S234, the hyperparameter HP1 is updated into the hyperparameter HP2 according to the second loss L2. Reference is further made to FIG. 9B, which is a schematic diagram illustrating the updating of the hyperparameter HP2 according to the second loss L2 in step S234 in some embodiments of the disclosure. As shown in FIG. 9B, after obtaining the second loss L2 corresponding to the second classification model parameter MP2 currently adopted by the classification model 146, the second loss L2 is backward propagated to the classification model 146, so as to obtain an improved classification model parameter MP2m which can reduce (or minimize) the second loss L2. Then, the improved classification model parameter MP2m is backward propagated to the hypernetwork 144, and an updated hyperparameter HP2 is obtained according to the backpropagation based on the improved classification model parameter MP2m. In some embodiments, stochastic gradient descent (SGD) algorithm can be used to find the improved classification model parameter MP2m to reduce (or minimize) the second loss L2.

As shown in FIG. 8 and FIG. 9B, if the hypernetwork parameter HNP2 used by the hypernetwork 144 remains unchanged, the hypernetwork 144 (based on the hypernetwork parameter HNP2) will map the updated hyperparameter HP2 onto the improved classification model parameter MP2m.

Based on aforesaid embodiments, in step S220, firstly, the hypernetwork parameter HNP1 is updated to the hypernetwork parameter HNP2. In step S230, the hyperparameter HP1 is updated to the hyperparameter HP2 based on the hypernetwork parameter HNP2. When step S230 is completed, if the convergence condition is not fulfilled yet, the method returns to step S220 based on the hyperparameter HP2, and perform steps S220 and S230 again with the hyperparameter HP2 and the hypernetwork parameter HNP2 as input conditions. In this case, the hyperparameters and hyperparameters can be updated again, and so on. The hypernetwork parameters and hyperparameters can be updated iteratively until the convergence conditions are fulfilled.

As shown in FIG. 1, during the training process of the machine learning system 100, the hyperparameter HP is configured to control the data augmentation operation of the data augmentation model 142, and the hyperparameter HP (through transformation by the hypernetwork 144) is also configured to control the classification operation of the classification model 146. In addition, different exploration classification models in the disclosure can share weights. By sharing weights, it can save storage and computing resources and accelerate the training speed. In addition, the machine learning system 100 of the disclosure may utilize the data augmentation model to increase the equivalent number of training samples TD, such that the training process of the classification model 146 does not require a large number of training samples TD, and the classification model 146 can still maintain high accuracy.

In the field of computer vision, the accuracy of deep learning mainly relies on a large amount of labeled training data. As the quality, quantity, and variety of training data increase, the performance of the classification model usually improves correspondingly. However, it is difficult to collect high-quality data to train the classification model. Therefore, it is hard to improve the performance of the classification model. One of the ways to solve this problem is to allow experts to manually design parameters for data augmentation, such as rotation angle, flip method, or brightness adjustment ratio. The data augmentation with manually designed parameters has been commonly used to train the high-performance classification model for computer vision. If machine learning can be used in automatically finding the parameters for data augmentation, it will be more efficient and more accurate. In aforesaid embodiments of the disclosure, it proposes a hypernetwork-based data augmentation (HBA), which generates multiple continuous exploration models using the hypernetwork, and uses the gradient descent method to automatically adjust the hyperparameters for data augmentation. Some embodiments of the disclosure adopt a weight sharing strategy to improve the speed and accuracy of calculation, and it can save time and resources for manually adjusting the parameters for data augmentation. In addition, whether the original training samples are sufficient or not, the data augmentation can effectively improve the accuracy of the classification model and reduce the over-fitting issue. Therefore, automatic adjustment of parameters for data augmentation can improve the overall model performance.

For practical applications, the machine learning method and the machine learning system in the disclosure can be utilized in various fields such as machine vision, image classification, or data classification. For example, this machine learning method can be used in classifying medical images. The machine learning method can be used to classify X-ray images in normal conditions, with pneumonia, with bronchitis, or with heart disease. The machine learning method can also be used to classify ultrasound images with normal fetuses or abnormal fetal positions. On the other hand, this machine learning method can also be used to classify images collected in automatic driving, such as distinguishing normal roads, roads with obstacles, and road conditions images of other vehicles. The machine learning method can be utilized in other similar fields. For example, the machine learning methods and machine learning systems in the disclosure can also be used in music spectrum recognition, spectral recognition, big data analysis, data feature recognition and other related machine learning fields.

Another embodiment in the disclosure is a non-transitory computer-readable medium containing at least one instruction program, which is executed by a processor (for example, the processing unit 140 in FIG. 1) to perform the machine learning method 200 in the embodiments shown in FIG. 2, FIG. 3, and FIG. 7.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A machine learning method, comprising:
(a) obtaining initial values of a hyperparameter and a hypernetwork parameter;
(b) generating a first classification model parameter according to the hyperparameter and the hypernetwork parameter, and updating the hypernetwork parameter according to a classification result based on the first classification model parameter relative to a training sample, wherein the step (b) comprises:
   (b1) performing data augmentation, by a data augmentation model based on the hyperparameter, on the training sample for generating an augmented training sample;
   (b2) converting the hyperparameter, by a hypernetwork based on the hypernetwork parameter and a plurality of exploration values, into a plurality of exploration classification model parameters; and
   (b3) forming a plurality of exploration classification models by the classification model based on the exploration classification model parameters respectively, and performing classification on the augmented training sample by the exploration classification models respectively for generating a plurality of first prediction labels corresponding to the augmented training sample;
(c) generating a second classification model parameter according to the hyperparameter and the hypernetwork parameter updated in the step (b), and updating the hyperparameter according to another classification result based on the second classification model parameter relative to a verification sample; and
(d) repeating the steps (b) and (c) for updating the hypernetwork parameter and the hyperparameter,
wherein each of the exploration classification models comprises a plurality of neural network structural layers, the neural network structural layers are divided into a first structural layer portion and a second structural layer portion after the first structural layer portion, each of the exploration classification model parameters for forming the exploration classification models comprises a first weight parameter content and a second weight parameter content, the first weight parameter content is configured to determine operations of the first structural layer portion, and the second weight parameter content is configured to determine operations of the second structural layer portion, each one of the first structure layer portions in front of the second structural layer portions within the exploration classification models has the first weight parameter content independent from the first weight parameter content of another exploration classification model within the exploration classification models, the second weight parameter contents applied to the second structural layer portion of a first exploration classification model of the exploration classification models are the same as the second weight parameter contents applied to the second structural layer portion of a second exploration classification model of the exploration classification models, the second structural layer portion of the first exploration classification model is operating with the same logic as the second structural layer portion of the second exploration classification model.

2. The machine learning method of claim 1, wherein the step (b) further comprises:
  (b4) updating the hypernetwork parameter according to a plurality of first losses generated by comparing the first prediction labels with a training label of the training sample.

3. The machine learning method of claim 2, wherein the step (b4) comprises:
  calculating the first losses by comparing the first prediction labels with the training label of the training sample; and
  updating the hypernetwork parameter according to the exploration classification models and the first losses corresponding to the exploration classification models.

4. The machine learning method of claim 3, wherein in the step (b4):
  calculating the first losses by a cross-entropy calculation between the first prediction labels of the exploration classification models and the training label respectively.

5. The machine learning method of claim 1, wherein the first structural layer portion in each of the exploration classification models comprises at least one first convolutional layer, the first convolutional layers among the exploration classification models have different weight parameters from each other.

6. The machine learning method of claim 1, wherein the second structural layer portion in each of the exploration classification models comprises at least one second convolutional layer and at least one fully connected layer, the at least one second convolutional layer and the at least one fully connected layer among the exploration classification models have same weight parameters across the exploration classification models.

7. The machine learning method of claim 1, wherein the step (c) comprises:
  (c1) converting the hyperparameter, by a hypernetwork based on the hypernetwork parameter updated in the step (b), into the second classification model parameter;
  (c2) performing classification, by a classification model based on the second classification model parameter, on the verification sample for generating a second prediction label corresponding to the verification sample; and
  (c3) updating the hyperparameter according to a second loss generated by comparing the second prediction label with a verification label of the verification sample.

8. The machine learning method of claim 7, wherein the step (c3) comprises:
  calculating the second loss by a cross-entropy calculation between the second prediction label and the verification label.

9. A machine learning system, comprising:
  a memory unit, configured for storing initial values of a hyperparameter and a hypernetwork parameter;
  a processing unit, coupled with the memory unit, wherein the processing unit is configured to run a hypernetwork, a data augmentation model and a classification model, the processing unit is configured to execute operations of:
  (a) generating a first classification model parameter by the hypernetwork according to the hyperparameter and the hypernetwork parameter, generating a classification result by the classification model based on the first classification model parameter relative to a training sample, and updating the hypernetwork parameter according to the classification result, wherein the operation (a) comprises:
    (a1) performing data augmentation, by the data augmentation model based on the hyperparameter, on the training sample for generating an augmented training sample;
    (a2) converting the hyperparameter, by the hypernetwork based on the hypernetwork parameter and a plurality of exploration values, into a plurality of exploration classification model parameters; and
    (a3) forming a plurality of exploration classification models by the classification model based on the exploration classification model parameters respectively, and performing classification on the augmented training sample by the exploration classification models respectively for generating a plurality of first prediction labels corresponding to the augmented training sample;
  (b) generating a second classification model parameter by the hypernetwork according to the hyperparameter and the hypernetwork parameter updated in the step (a), generating another classification result by the classification model based on the second classification model parameter relative to a verification sample, and updating the hyperparameter according to the another classification result; and
  (c) repeating the operations (a) and (b) for updating the hypernetwork parameter and the hyperparameter,
  wherein each of the exploration classification models comprises a plurality of neural network structural layers, the neural network structural layers are divided into a first structural layer portion and a second structural layer portion after the first structural layer portion, each of the exploration classification model parameters for forming the exploration classification models comprises a first weight parameter content and a second weight parameter content, the first weight parameter content is configured to determine operations of the first structural layer portion, and the second weight parameter content is configured to determine operations of the second structural layer portion, each one of the first structure layer portions in front of the second structural layer portions within the exploration classification models has the first weight parameter content independent from the first weight parameter content of another exploration classification model within the exploration classification models, the second weight parameter contents applied to the second structural layer portion of a first exploration classification model of the exploration classification models are the same as the second weight parameter contents applied to the second structural layer portion of a second exploration classification model of the exploration classification models, the second structural layer portion of the first exploration classification model is operating with the same logic as the second structural layer portion of the second exploration classification model.

10. The machine learning system of claim 9, wherein the operation (a) executed by the processing unit further comprises:
  (a4) updating the hypernetwork parameter according to a plurality of first losses generated by comparing the first prediction labels with a training label of the training sample.

11. The machine learning system of claim 10, wherein the operation (a4) executed by the processing unit comprises:
  calculating the first losses by comparing the first prediction labels with the training label of the training sample; and updating the hypernetwork parameter according to the exploration classification models and the first losses corresponding to the exploration classification models.

12. The machine learning system of claim 11, wherein the operation (a2) executed by the processing unit comprises:
calculating the first losses by a cross-entropy calculation between the first prediction labels of the exploration classification models and the training label respectively.

13. The machine learning system of claim 9, wherein the first structural layer portion in each of the exploration classification models comprises at least one first convolutional layer, the first convolutional layers among the exploration classification models have different weight parameters from each other.

14. The machine learning system of claim 9, wherein the second structural layer portion in each of the exploration classification models comprises at least one second convolutional layer and at least one fully connected layer, the at least one second convolutional layer and the at least one fully connected layer among the exploration classification models have same weight parameters across the exploration classification models.

15. The machine learning system of claim 9, wherein the operation (b) executed by the processing unit comprises:
(b1) converting the hyperparameter, by the hypernetwork based on the hypernetwork parameter updated in the step (a), into the second classification model parameter;
(b2) performing classification, by the classification model based on the second classification model parameter, on the verification sample for generating a second prediction label corresponding to the verification sample; and
(b3) updating the hyperparameter according to a second loss generated by comparing the second prediction label with a verification label of the verification sample.

16. A non-transitory computer-readable storage medium, storing at least one instruction program executed by a processor to perform a machine learning method, the machine learning method comprising:
(a) obtaining initial values of a hyperparameter and a hypernetwork parameter;
(b) generating a first classification model parameter according to the hyperparameter and the hypernetwork parameter, and updating the hypernetwork parameter according to a classification result based on the first classification model parameter relative to a training sample, wherein the step (b) comprises:
(b1) performing data augmentation, by a data augmentation model based on the hyperparameter, on the training sample for generating an augmented training sample;
(b2) converting the hyperparameter, by a hypernetwork based on the hypernetwork parameter and a plurality of exploration values, into a plurality of exploration classification model parameters; and
(b3) forming a plurality of exploration classification models by the classification model based on the exploration classification model parameters respectively, and performing classification on the augmented training sample by the exploration classification models respectively for generating a plurality of first prediction labels corresponding to the augmented training sample;
(c) generating a second classification model parameter according to the hyperparameter and the hypernetwork parameter updated in the step (b), and updating the hyperparameter according to another classification result based on the second classification model parameter relative to a verification sample; and
(d) repeating the steps (b) and (c) for updating the hypernetwork parameter and the hyperparameter,
wherein each of the exploration classification models comprises a plurality of neural network structural layers, the neural network structural layers are divided into a first structural layer portion and a second structural layer portion after the first structural layer portion, each of the exploration classification model parameters for forming the exploration classification models comprises a first weight parameter content and a second weight parameter content, the first weight parameter content is configured to determine operations of the first structural layer portion, and the second weight parameter content is configured to determine operations of the second structural layer portion, each one of the first structure layer portions in front of the second structural layer portions within the exploration classification models has the first weight parameter content independent from the first weight parameter content of another exploration classification model within the exploration classification models, the second weight parameter contents applied to the second structural layer portion of a first exploration classification model of the exploration classification models are the same as the second weight parameter contents applied to the second structural layer portion of a second exploration classification model of the exploration classification models, the second structural layer portion of the first exploration classification model is operating with the same logic as the second structural layer portion of the second exploration classification model.

* * * * *